United States Patent
Yoneda

(10) Patent No.: US 9,374,149 B2
(45) Date of Patent: Jun. 21, 2016

(54) RECEIVER CIRCUIT AND RECEPTION METHOD

(71) Applicant: Socionext Inc., Yokohama-shi, Kanagawa (JP)

(72) Inventor: Naoto Yoneda, Kawasaki (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/835,066

(22) Filed: Aug. 25, 2015

(65) Prior Publication Data

US 2016/0065296 A1    Mar. 3, 2016

(30) Foreign Application Priority Data

Sep. 3, 2014  (JP) ................................. 2014-179207

(51) Int. Cl.
*H04B 1/7115* (2011.01)
*H04B 7/08* (2006.01)
*H04L 27/00* (2006.01)
*H04L 25/03* (2006.01)
*H04L 27/38* (2006.01)

(52) U.S. Cl.
CPC ........ *H04B 7/0885* (2013.01); *H04L 25/03821* (2013.01); *H04L 27/0008* (2013.01); *H04L 27/38* (2013.01)

(58) Field of Classification Search
CPC .... H04B 1/7097; H04B 1/7103; H04B 1/126; H04B 7/0845; H04B 1/7115; H04B 7/0817; H04B 7/0802; H04B 7/082; H04B 7/088; H03M 5/02; H04L 25/0204
USPC ................... 375/144, 148, 347–349
See application file for complete search history.

(56) References Cited

U.S. PATENT DOCUMENTS

| | | | | |
|---|---|---|---|---|
| 5,889,826 A * | 3/1999 | Takahashi | ................. | H04L 1/06 375/347 |
| 6,181,749 B1 * | 1/2001 | Urabe | ................... | H01Q 3/267 375/267 |
| 6,940,932 B2 * | 9/2005 | Henriksson | ......... | H04L 27/2647 375/347 |
| 7,636,593 B2 * | 12/2009 | Kurioka | ............... | H04B 7/0814 342/374 |
| 7,672,410 B2 * | 3/2010 | Yang | .................... | H04B 7/0817 375/347 |
| 7,944,996 B2 * | 5/2011 | Tsukio | ...................... | H04L 1/20 370/206 |
| 8,422,482 B2 * | 4/2013 | Sugita | .................. | H04B 7/0811 370/203 |

(Continued)

FOREIGN PATENT DOCUMENTS

| | | |
|---|---|---|
| JP | 2006-41568 A | 2/2006 |
| JP | 2011-146872 A | 7/2011 |
| JP | 2012-109993 A | 6/2012 |

*Primary Examiner* — Emmanuel Bayard
(74) *Attorney, Agent, or Firm* — Arent Fox LLP

(57) ABSTRACT

First and second transmission channel correction circuits generate a corrected data signal and a corrected control signal by executing a transmission channel correction to a data signal transmitted by a first modulation method and a control signal transmitted by a second modulation method that is more tolerant to noise than the first modulation method. The data signal and control signal are included in reception signals received by first and second antennas. First and second quality information calculation circuits calculate quality information indicating quality of the reception signal on the basis of the corrected control signal. A combination ratio calculation circuit calculates a combination ratio of the corrected data signals generated by the first and second transmission channel correction circuits, on the basis of two types of quality information calculated by the first and second quality information calculation circuits. A combination circuit executes combination at the combination ratio.

16 Claims, 17 Drawing Sheets

(56) References Cited

U.S. PATENT DOCUMENTS

| | | | | |
|---|---|---|---|---|
| 8,792,599 B2* | 7/2014 | Takai | ............... | H04B 7/082 375/247 |
| 8,831,526 B2* | 9/2014 | Hasegawa | ......... | H04B 17/0042 455/562.1 |
| 8,848,646 B2* | 9/2014 | Kakishima | ........... | H04B 7/0417 370/329 |
| 2009/0225913 A1 | 9/2009 | Nakahara et al. | | |
| 2009/0267842 A1* | 10/2009 | Takagi | .................... | H04B 1/18 343/702 |

* cited by examiner

VALUE OF QUALITY INFORMATION OF EACH CARRIER WHEN QUALITY
INFORMATION OF DATA SIGNAL (MER) INCLUDES ERROR [DB]

| CARRIER NUMBER (FREQUENCY) | ... | 14 | 15 | 16 | 17 | 18 | 19 | 20 | 21 | 22 | 23 | 24 | 25 | 26 | ... |
|---|---|---|---|---|---|---|---|---|---|---|---|---|---|---|---|
| CARRIER TYPE | ... | data | data | data | data | data | data | AC | data | data | data | data | data | data | ... |
| BEFORE MIXING SIGNAL PROCESSING UNIT 51a | ... | 8.0 | 8.0 | 8.0 | 8.0 | 8.0 | 8.0 | 2.0 | 8.0 | 8.0 | 8.0 | 8.0 | 8.0 | 8.0 | ... |
| BEFORE MIXING SIGNAL PROCESSING UNIT 51b | ... | 4.0 | 4.0 | 4.0 | 4.0 | 4.0 | 4.0 | 6.0 | 4.0 | 4.0 | 4.0 | 4.0 | 4.0 | 4.0 | |
| RATIO | ... | 0.0 | 0.0 | 0.2 | 0.4 | 0.6 | 0.8 | 1.0 | 0.8 | 0.6 | 0.4 | 0.2 | 0.0 | 0.0 | ... |
| AFTER MIXING SIGNAL PROCESSING UNIT 51a | ... | 8.0 | 8.0 | 6.8 | 5.6 | 4.4 | 3.2 | 2.0 | 3.2 | 4.4 | 5.6 | 6.8 | 8.0 | 8.0 | |
| AFTER MIXING SIGNAL PROCESSING UNIT 51b | ... | 4.0 | 4.0 | 4.4 | 4.8 | 5.2 | 5.6 | 6.0 | 5.6 | 5.2 | 4.8 | 4.4 | 4.0 | 4.0 | |

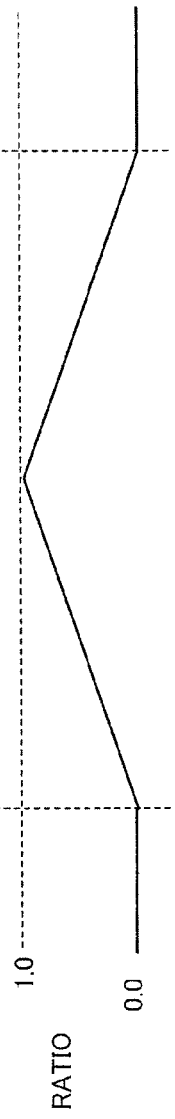

FIG. 14

RECEIVER CIRCUIT AND RECEPTION METHOD

CROSS-REFERENCE TO RELATED APPLICATION

This application is based upon and claims the benefit of priority of the prior Japanese Patent Application No. 2014-179207, filed on Sep. 3, 2014, the entire contents of which are incorporated herein by reference.

FIELD

The embodiments discussed herein relate to a receiver circuit and a reception method.

BACKGROUND

With regard to a receiver circuit of terrestrial digital broadcasting, there is a known method called diversity combining (which is also referred to as diversity reception) which combines signals received using a plurality of antennas for the purpose of reception performance improvement. A combination ratio of the diversity combining is decided on the basis of quality information (for example, carrier-to-noise ratio (CN)) that is calculated for each antenna and indicates quality of a reception signal.

The method for calculating quality information can be a method using a modulation error ratio (MER). The MER is calculated on the basis of a distance of a reception signal point from an ideal reception signal point. The reception signal point is obtained by demodulating a data signal (modulated signal) in an orthogonal frequency division multiplexing (OFDM) carrier and plotting it on an I-Q plane. The data signal is modulated by a modulation method, such as quadrature phase shift keying (QPSK), 16 quadrature amplitude modulation (QAM) or 64QAM, for example. The distance between the reception signal point and the ideal reception signal point is caused by noise. As the distance is larger, the quality is worse (CN is lower). As the distance is smaller, the quality is better (CN is higher).

See, for example, Japanese Laid-open Patent Publication No. 2012-109993.

However, when a distance between a reception signal point and an ideal reception signal point corresponding to the reception signal point becomes larger, it is possible that another ideal reception signal point that is closer to the reception signal point is used for calculating the distance. In that case, the calculated distance is smaller than reality, and the accurate quality information is unable to be obtained. As the modulation method is less tolerant to noise, the distance is more likely to be calculated erroneously.

To solve this, one can conceive of calculating quality information, using a control signal (auxiliary channel (AC), transmission and multiplexing configuration control (TMCC), etc.) which is modulated by a modulation method that is more tolerant to noise than a modulation method of a data signal is. However, unlike signals combined by diversity combining, transmission channel correction (e.g., equalization) for reducing inter-carrier interference is not performed on control signals, such as AC and TMCC. The quality information calculated from such control signals is inaccurate, in some cases.

As described above, when the quality information used in calculating a combination ratio is inaccurate, diversity combining is not performed accurately.

SUMMARY

According to one aspect, there is provided a receiver circuit for performing diversity combining, including: a first transmission channel correction circuit configured to generate a third signal from a first signal, and a fourth signal from a second signal, by executing a transmission channel correction to the first signal and the second signal, the first signal being transmitted by a first modulation method, the second signal being transmitted by a second modulation method that is more tolerant to noise than the first modulation method, the first signal and the second signal being included in a first reception signal received by a first antenna; a first quality information calculation circuit configured to calculate first quality information indicating quality of the first reception signal on the basis of the fourth signal; a second transmission channel correction circuit configured to generate a seventh signal from a fifth signal, and an eighth signal from a sixth signal, by executing a transmission channel correction to the fifth signal and the sixth signal, the fifth signal being transmitted by the first modulation method, the sixth signal being transmitted by the second modulation method, the fifth signal and the sixth signal being included in a second reception signal received by a second antenna; a second quality information calculation circuit configured to calculate second quality information indicating quality of the second reception signal on the basis of the eighth signal; a combination ratio calculation circuit configured to calculate a combination ratio of the third signal and the seventh signal on the basis of the first quality information and the second quality information; and a combination circuit configured to combine the third signal and the seventh signal, at the combination ratio.

The object and advantages of the invention will be realized and attained by means of the elements and combinations particularly pointed out in the claims.

It is to be understood that both foregoing general description and the following detailed description are exemplary and explanatory and are not restrictive of the invention.

BRIEF DESCRIPTION OF DRAWINGS

FIG. 14 illustrates an example of values and ratios before and after mixing quality information of each carrier when the quality information of a data signal includes an error;

DESCRIPTION OF EMBODIMENTS

Figure 1:
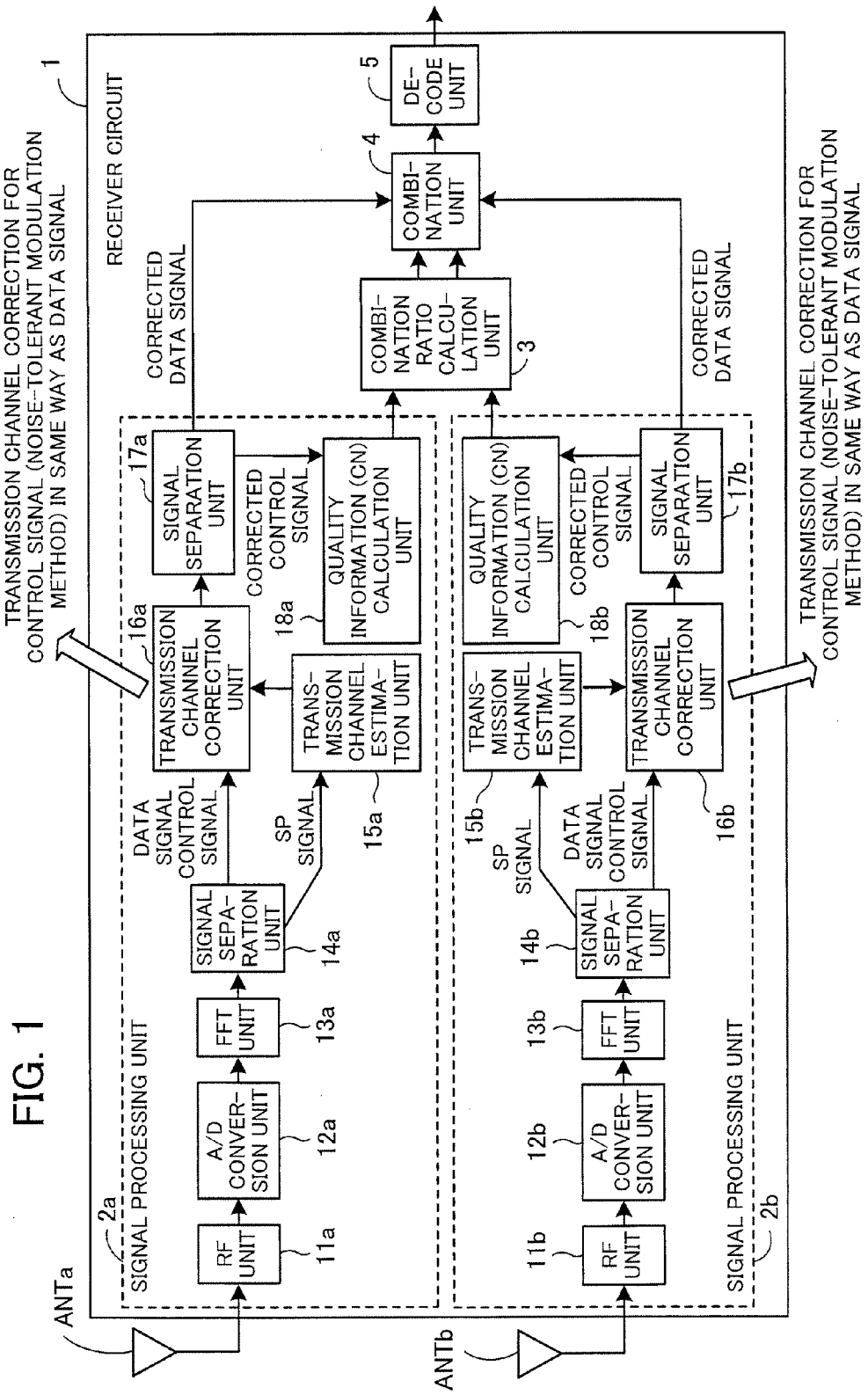
FIG. 1 illustrates an example of a receiver circuit of a first embodiment.

Several embodiments will be described below with reference to the accompanying drawings, wherein like reference numerals refer to like elements throughout.

(First Embodiment)

FIG. 1 illustrates an example of a receiver circuit of the first embodiment. A receiver circuit 1 executes diversity combining, which is a method for combining reception signals received by a plurality of antennas ANTa and ANTb (two in the example of FIG. 1). The receiver circuit 1 receives a signal modulated by OFDM and includes signal processing units 2a and 2b, a combination ratio calculation unit 3, a combination unit 4, and a decode unit 5. Each unit included in the receiver circuit 1 is, for example, a circuit constituting a part of the receiver circuit 1.

The signal processing units 2a and 2b include radio frequency (RF) units 11a and 11b, analog-to-digital (A/D) conversion units 12a and 12b, fast Fourier transform (FFT) units 13a and 13b, signal separation units 14a and 14b, and transmission channel estimation units 15a and 15b. Further, the signal processing units 2a and 2b include transmission channel correction units 16a and 16b, signal separation units 17a and 17b, and quality information (CN) calculation units 18a and 18b. Each unit included in the signal processing units 2a and 2b is, for example, a circuit constituting a part of the signal processing units 2a and 2b.

The RF units 11a and 11b execute a process such as a demodulation process to the reception signals received by the two antennas ANTa and ANTb located at the different positions. Note that a reception signal includes data signals, scattered pilot (SP) signals, and control signals (AC or TMCC). The data signal is modulated by a modulation method, such as QPSK, 16QAM, or 64QAM. In contrast, the AC, TMCC, and SP signals are modulated by a modulation method (such as differential binary phase shift keying (DBPSK) or BPSK) that is more tolerant to noise than the modulation method of the data signal is (i.e., an error due to noise is less likely to occur).

The A/D conversion units 12a and 12b convert output signals from the RF units 11a and 11b to digital signals. The FFT units 13a and 13b execute FFT to the output signals from the A/D conversion units 12a and 12b. The signal separation units 14a and 14b separate the reception signal after FFT, depending on the type of the signal. In the example of FIG. 1, the signal separation units 14a and 14b divide the SP signals from the data signals and the control signals.

Figure 2:
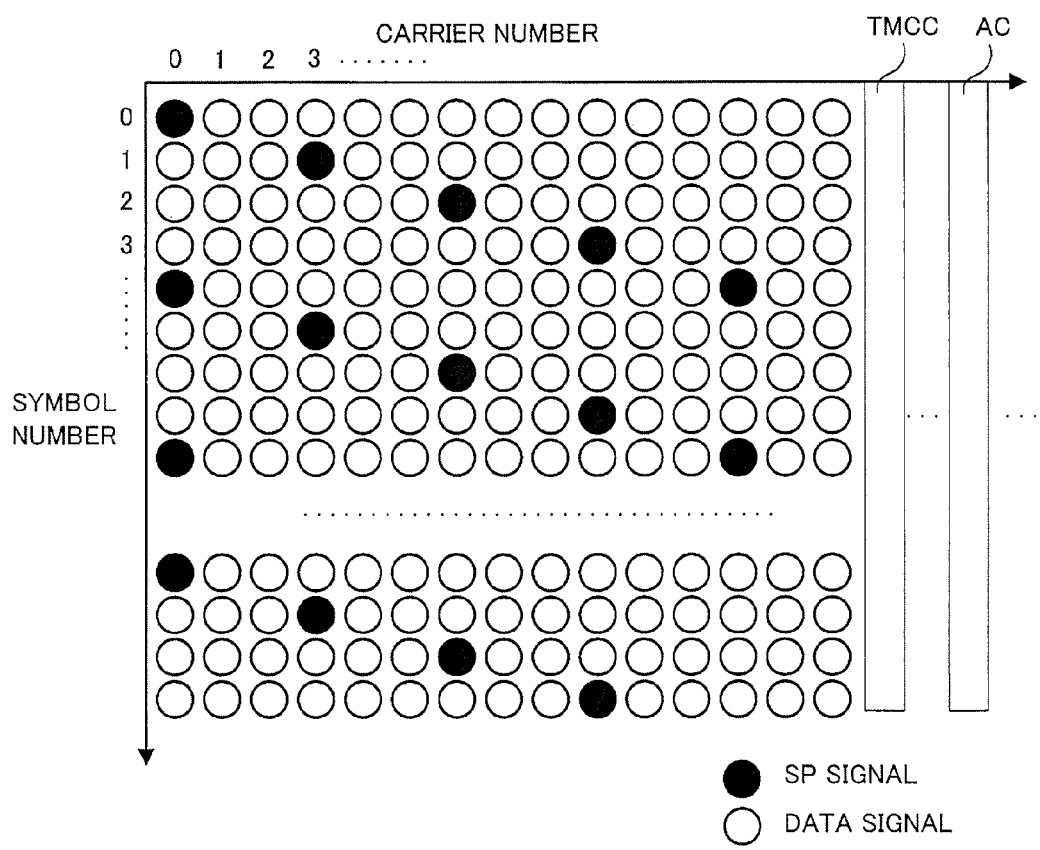
FIG. 2 illustrates an example of a frame configuration of one segment of OFDM.

FIG. 2 illustrates an example of a frame configuration of one segment of OFDM. The horizontal axis indicates a carrier number, and the vertical axis indicates a symbol number. The carrier number corresponds to frequency, and the symbol number corresponds to time. Also, a black circle represents an SP signal, and a white circle represents a data signal.

For example, the SP signal is located at every twelfth signal in the carrier number direction, and at every fourth signal in the symbol number direction. Note that TMCC and AC are located at one or a plurality of certain carrier numbers that are different in each segment.

The description returns to FIG. 1. The transmission channel estimation units 15a and 15b calculate a transmission channel estimation value on the basis of the SP signal. For example, the transmission channel estimation units 15a and 15b interpolate the data signals and the control signals arrayed in the symbol number direction, using a plurality of SP signals arrayed in the symbol number direction, and interpolate the data signals and the control signals arrayed in the carrier number direction, using a plurality of SP signals arrayed in the carrier number direction, in order to calculate a transmission channel estimation value. The interpolation method is, for example, a linear interpolation method or an oblique interpolation method.

The transmission channel correction units 16a and 16b execute the same transmission channel correction (e.g., equalization) not only to a data signal but also to a control signal, using the transmission channel estimation value generated by the transmission channel estimation units 15a and 15b. For example, the transmission channel correction units 16a and 16b execute the transmission channel correction, by dividing each of the data signal and the control signal by the transmission channel estimation value as a complex number. Note that the SP signal is a kind of the control signal, but the SP signal is a signal for calculating the transmission channel estimation value, and thus the transmission channel correction is not executed on the SP signal.

The signal separation units 17a and 17b separate a corrected data signal and a corrected control signal, which are the data signal and the control signal after the transmission channel correction output from the transmission channel correction units 16a and 16b. The quality information calculation units 18a and 18b calculate quality information indicating quality of the reception signal, from the corrected control signal. In the receiver circuit 1 of the first embodiment, the quality information calculation units 18a and 18b calculate a carrier-to-noise ratio based on the modulation method of the control signal, as the quality information.

Figure 3:
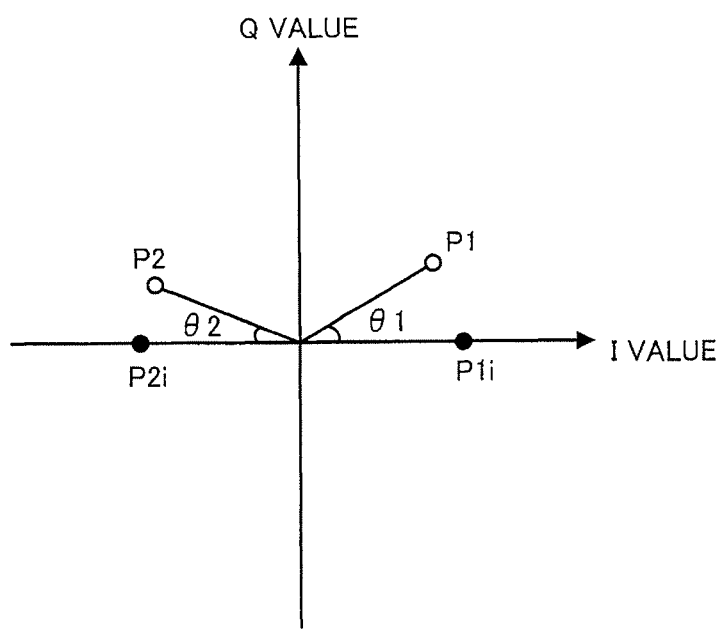
FIG. 3 illustrates an example of calculation of a carrier-to-noise ratio when a modulation method is DBPSK.

FIG. 3 illustrates an example of calculation of a carrier-to-noise ratio when the modulation method is DBPSK. Reception signal points P1 and P2 plotted on the I-Q plane are illustrated. In DBPSK, there are two ideal reception signal points P1$i$ and P2$i$. For example, the reception signal point P1 is misaligned by a phase error $\theta 1$ relative to the ideal reception signal point P1$i$. This phase error $\theta 1$ corresponds to noise amount. The reception signal point P2 is misaligned by a phase error $\theta 2$ relative to the ideal reception signal point P2$i$. This phase error $\theta 2$ corresponds to noise amount.

In DBPSK, a phase error is calculated correctly, if the phase error of the reception signal point is large in relation to the ideal reception signal point to such an extent that the reception signal point is far beyond the boarder of quadrants in the I-Q plane. Hence, DBPSK is a modulation method tolerant to noise (an error due to noise is less likely to occur).

A carrier-to-noise ratio is calculated as a ratio between the electric power based on the above noise amount and the electric power of the carrier wave. Note that a carrier-to-noise ratio is calculated for each carrier number.

The combination ratio calculation unit 3 of FIG. 1 calculates a combination ratio of the corrected data signals output from the signal processing units 2a and 2b, on the basis of carrier-to-noise ratios output from the signal processing units 2a and 2b. For example, because a carrier-to-noise ratio is low when the noise amount is large, the combination ratio calculation unit 3 calculates a combination ratio that mainly uses the corrected data signal of a higher carrier-to-noise ratio (i.e., of a smaller noise amount). For example, the combination ratio calculation unit 3 calculates a combination ratio of CN1: CN2, where CN1 is a carrier-to-noise ratio output from the signal processing unit 2a, and CN2 is a carrier-to-noise ratio output from the signal processing unit 2b.

The combination unit 4 combines the corrected data signal output from the signal processing unit 2a and the corrected data signal output from the signal processing unit 2b, at the combination ratio calculated by the combination ratio calculation unit 3. The decode unit 5 decodes the combined signal output from the combination unit 4.

Figure 4:
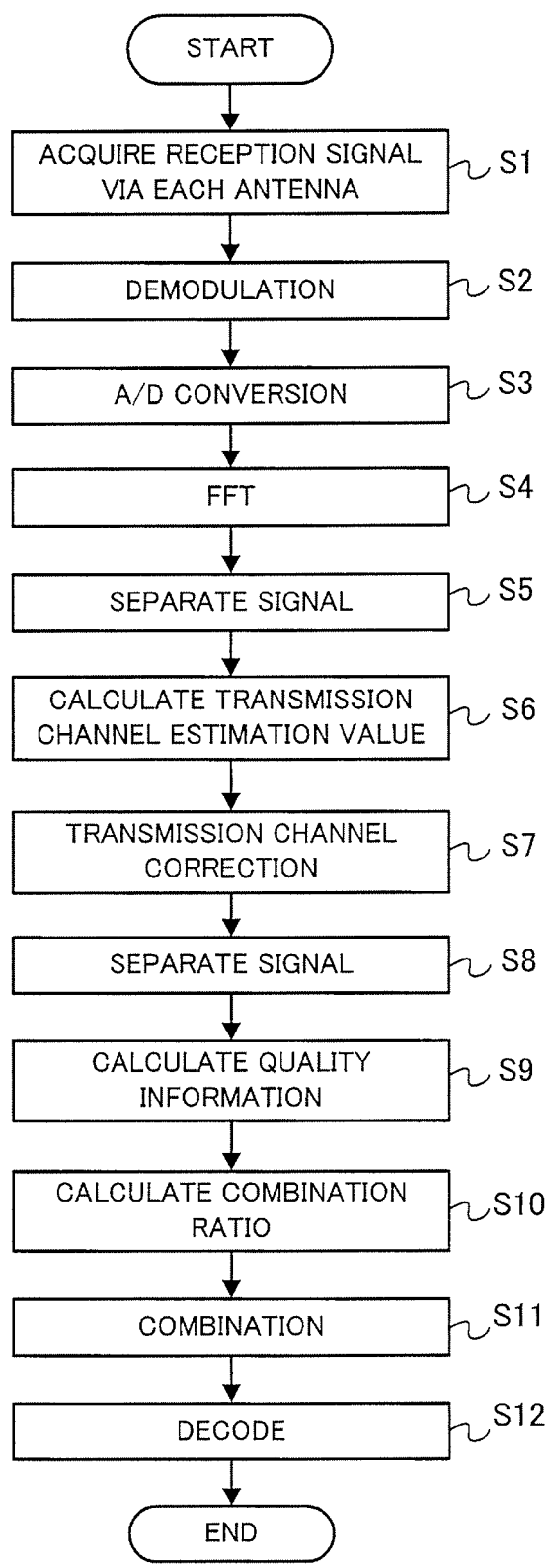
FIG. 4 is a flowchart illustrating a procedure of an example of a reception method by a receiver circuit of the first embodiment.

FIG. 4 is a flowchart illustrating a procedure of an example of the reception method by the receiver circuit of the first embodiment.

Step S1: The signal processing units 2a and 2b acquire reception signals via the antennas ANTa and ANTb.

Step S2: The RF units 11a and 11b demodulate the reception signals.

Step S3: The A/D conversion units 12a and 12b execute analog-to-digital conversion to the demodulated reception signals.

Step S4: The FFT units 13a and 13b execute FFT to the output signals from the A/D conversion units 12a and 12b.

Step S5: The signal separation units 14a and 14b separate the data signal, the control signal, and the SP signal.

Step S6: The transmission channel estimation units 15a and 15b calculate a transmission channel estimation value on the basis of the SP signal.

Step S7: The transmission channel correction units 16a and 16b execute the transmission channel correction to the data signal and the control signal, on the basis of the transmission channel estimation value.

Step S8: The signal separation units 17a and 17b separate the corrected data signal and the corrected control signal after the transmission channel correction, from each other.

Step S9: The quality information calculation units 18a and 18b calculate quality information on the basis of the corrected control signal.

Step S10: The combination ratio calculation unit 3 calculates a combination ratio of the corrected data signals output from the signal processing units 2a and 2b, on the basis of the quality information output from the signal processing units 2a and 2b.

Step S11: The combination unit 4 combines the corrected data signals output from the signal processing units 2a and 2b, on the basis of the combination ratio calculated by the combination ratio calculation unit 3.

Step S12: The decode unit 5 decodes the combined signal output from the combination unit 4.

In the following, two comparative examples are illustrated for describing the advantages of the receiver circuit 1 and the reception method of the present embodiment.

(Comparative Example 1)

Figure 5:
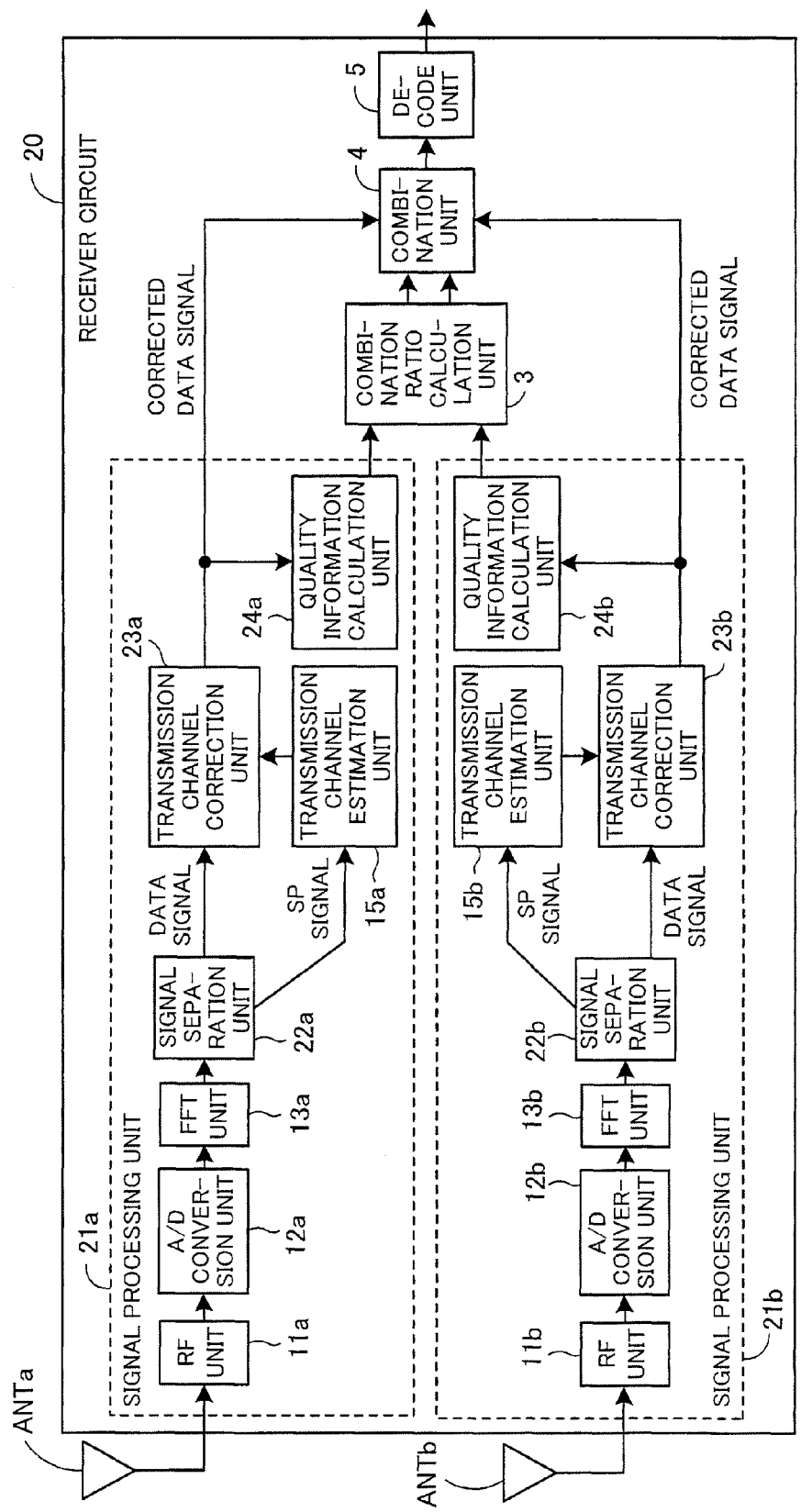
FIG. 5 illustrates a receiver circuit of a first comparative example.

FIG. 5 illustrates a receiver circuit of the first comparative example. The same elements as the receiver circuit 1 illustrated in FIG. 1 are denoted with the same reference signs, and their descriptions will be omitted.

In the receiver circuit 20 of FIG. 5, signal processing units 21a and 21b are different from the signal processing units 2a and 2b of the receiver circuit 1 of the first embodiment. The signal separation units 22a and 22b of the signal processing units 21a and 21b separate the reception signal after FFT into a data signal and an SP signal. The transmission channel correction units 23a and 23b execute the transmission channel correction to the data signal, and do not execute the transmission channel correction to the control signal. Also, the quality information calculation units 24a and 24b calculate quality information, not on the basis of the control signal, but on the basis of the corrected data signal after the transmission channel correction.

The quality information calculation units 24a and 24b calculate a modulation error ratio as the quality information, on the basis of the corrected data signal, for example. A modulation error ratio is calculated on the basis of the distance, resulting from noise, of a reception signal point from an ideal reception signal point on the I-Q plane on which the demodulated data signal is plotted.

Figure 6:
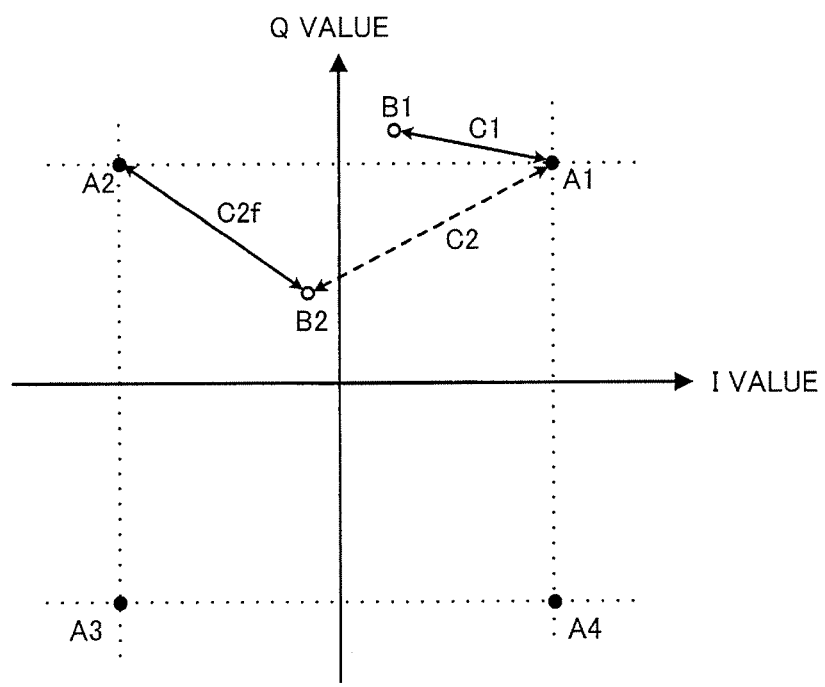
FIG. 6 illustrates a calculation example of a distance when a modulation method of a data signal is QPSK.

FIG. 6 illustrates a calculation example of the distance when the modulation method of the data signal is QPSK. In FIG. 6, reception signal points B1 and B2 plotted on the I-Q plane are illustrated. In QPSK, four ideal reception signal points A1, A2, A3, and A4 are in four quadrants, respectively.

The distance of the reception signal point B1 from the ideal reception signal point is calculated as the distance C1 between the reception signal point B1 and the ideal reception signal point A1 closest to the reception signal point B1. The distance of the reception signal point B2 from the ideal reception signal point is calculated as the distance C2f between the reception signal point B2 and the ideal reception signal point A2 closest to the reception signal point B2. However, it is possible that the reception signal point B2 is so distant in reality, that the distance C2 from the ideal reception signal point A1 is to be calculated.

As described above, it is possible that a wrong distance is calculated in a modulation method such as QPSK, because of intolerance to noise. When the modulation method of the data signal is 16QAM or 64QAM, it is possible that the same errors are caused more frequently because of the increased ideal reception signal points.

In contrast, in the receiver circuit 1 of the first embodiment, the above error is less likely to occur, because the quality information is calculated, using the control signal (AC and TMCC) modulated by the modulation method (DBPSK etc.) that is more tolerant to noise than the data signal.

(Comparative Example 2)

Figure 7:
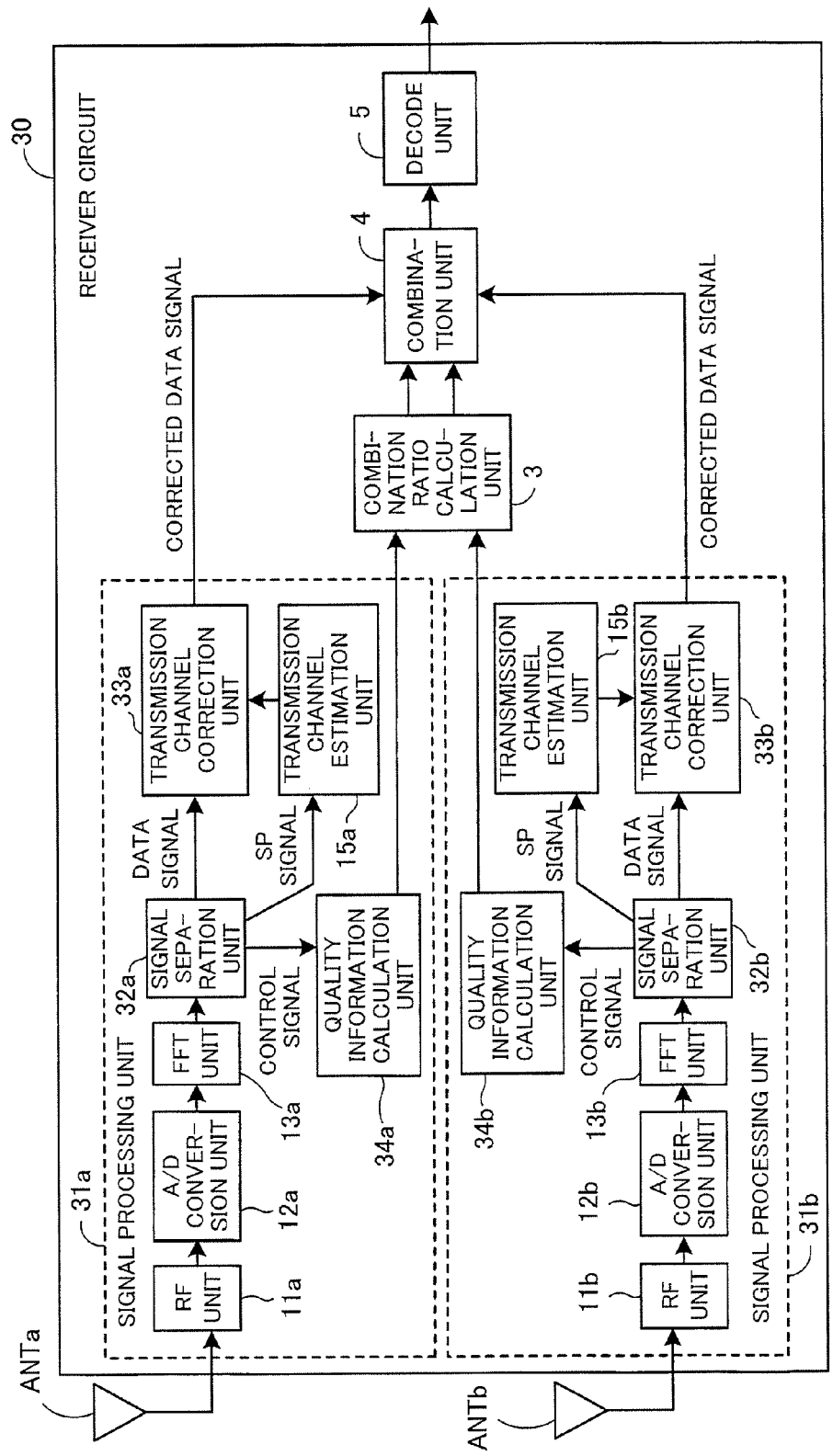
FIG. 7 illustrates a receiver circuit of a second comparative example.

FIG. 7 illustrates a receiver circuit of the second comparative example. The same elements as the receiver circuit 1 illustrated in FIG. 1 are denoted with the same reference signs, and their descriptions will be omitted.

In the receiver circuit 30 of FIG. 7, signal processing units 31a and 31b are different from the signal processing units 2a and 2b of the receiver circuit 1 of the first embodiment. The signal separation units 32a and 32b of the signal processing units 31a and 31b separate the reception signal after FFT into a data signal, an SP signal, and a control signal. The transmission channel correction units 33a and 33b execute the transmission channel correction to the data signal, and do not execute the transmission channel correction to the control signal. The quality information calculation units 34a and 34b calculate quality information on the basis of the control signal. The quality information calculation units 34a and 34b calculate a carrier-to-noise ratio as the quality information, by the method illustrated in FIG. 3, on the basis of the control signal, for example.

The receiver circuit 30 of the second comparative example calculates the quality information on the basis of the control signal modulated by the modulation method that is tolerant to noise, but the transmission channel correction is not executed to this control signal, unlike the receiver circuit 1 of the first embodiment. The combination unit 4 combines the corrected data signals to which the transmission channel correction is executed by the transmission channel correction units 33a and 33b. It is possible that a high quality combined signal is not obtained, when the combination ratio is calculated from a carrier-to-noise ratio that is based on the control signal to which the transmission channel correction is not executed.

In contrast, in the receiver circuit 1 of the first embodiment, the transmission channel correction is executed to the control signal in the same way as the data signal, and a carrier-to-noise ratio is calculated on the basis of the corrected control signal for which the transmission channel is corrected. Hence, a carrier-to-noise ratio is so accurate, that the combination is executed at the combination ratio on which the transmission channel correction is reflected, improving the combination accuracy. This improves the reception performance.

(Second Embodiment)

Figure 8:
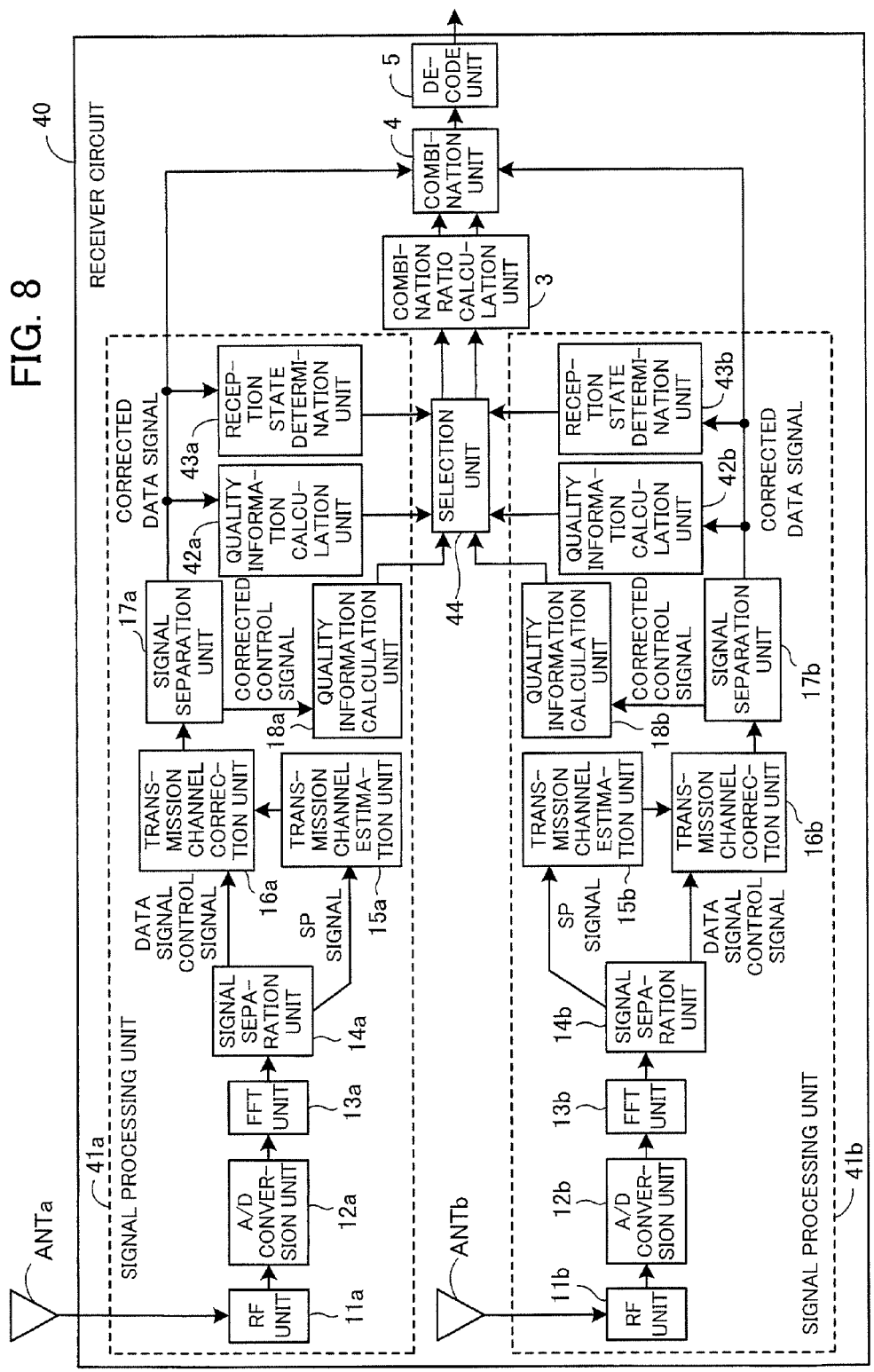
FIG. 8 illustrates an example of a receiver circuit of a second embodiment.

FIG. 8 illustrates an example of a receiver circuit of the second embodiment. The same elements as the receiver circuit 1 illustrated in FIG. 1 are denoted with the same reference signs, and their descriptions will be omitted. Each unit included in the receiver circuit 40 is, for example, a circuit constituting a part of the receiver circuit 40.

In the receiver circuit 40 of the second embodiment, the signal processing units 41a and 41b include quality information calculation units 42a and 42b and reception state determination units 43a and 43b. Also, the receiver circuit 40 includes a selection unit 44. Each unit included in the signal processing units 41a and 41b is, for example, a circuit constituting a part of the signal processing units 41a and 41b.

The quality information calculation units 42a and 42b calculate quality information indicating quality of a reception signal received by the antennas ANTa and ANTb, on the basis of the corrected data signal to which the transmission channel correction is executed. The quality information calculation units 42a and 42b calculate the aforementioned modulation error ratio as the quality information, for example. Note that the value of a modulation error ratio is approximately equal to the value of a carrier-to-noise ratio at the time of the Gaussian noise, and therefore may be handled in the same way as a carrier-to-noise ratio. For example, one quality information used in the calculation of the combination ratio may be a carrier-to-noise ratio, and the other quality information may be a modulation error ratio.

The reception state determination units 43a and 43b determine whether the reception state is good or not when receiving a reception signal that has been received by the antennas ANTa and ANTb, on the basis of the corrected data signal.

When the reception state determination unit 43a determines that the reception state is bad, the selection unit 44 selects the quality information calculated by the quality information calculation unit 18a. When the reception state determination unit 43a determines that the reception state is good, the selection unit 44 selects the quality information calculated by the quality information calculation unit 42a, and supplies it to the combination ratio calculation unit 3. Also, when the reception state determination unit 43b determines that the reception state is bad, the selection unit 44 selects the quality information calculated by the quality information calculation unit 18b. When the reception state determination unit 43b determines that the reception state is good, the selection unit 44 selects the quality information calculated by the quality information calculation unit 42b, and supplies it to the combination ratio calculation unit 3.

Figure 9:
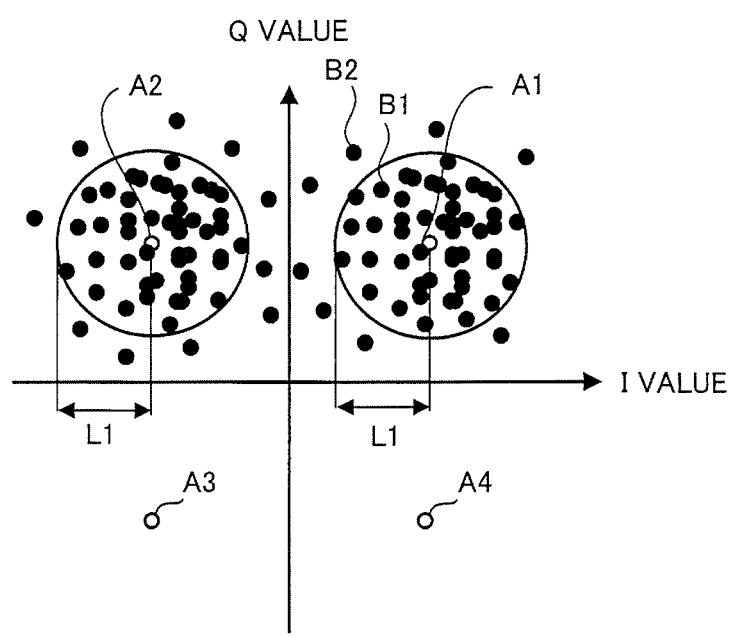
FIG. 9 illustrates a first determination example of whether a reception state is good or not.

The reception state determination units 43a and 43b determine whether the reception state is good or not, as described below, for example. FIG. 9 illustrates a first determination example of whether the reception state is good or not. FIG. 9 illustrates ideal reception signal points A1 to A4 when the modulation method of the data signal is QPSK, and reception signal points (illustrated as black circles) of the corrected data signal, which are plotted on the I-Q plane.

For example, the reception state determination unit 43a determines whether the reception state is good or not, on the basis of the number of reception signal points at positions that is more than a certain distance L1 away from the ideal reception signal points A1 to A4 in the I-Q plane illustrated in FIG. 9. For example, the position of the reception signal point B1 is not more than the distance L1 away from the ideal reception signal point A1, but the position of the reception signal point B2 is more than the distance L1 away from the ideal reception signal point A1. For example, the reception state determination units 43a and 43b determine that the reception state is bad, when the number of reception signal points that are more than the distance L1 away is equal to or larger than a certain value. The reception state determination units 43a and 43b determine that the reception state is good, when the number of reception signal points that are more than the distance L1 away is fewer than the certain value.

For example, if the certain value is 20 in an example illustrated in FIG. 9, the number of reception signal points at positions that are more than the distance L1 away from the ideal reception signal points A1 to A4 is 18, and therefore the reception state determination unit 43a determines that the reception state of the reception signal received by the antenna ANTa is good.

Figure 10:
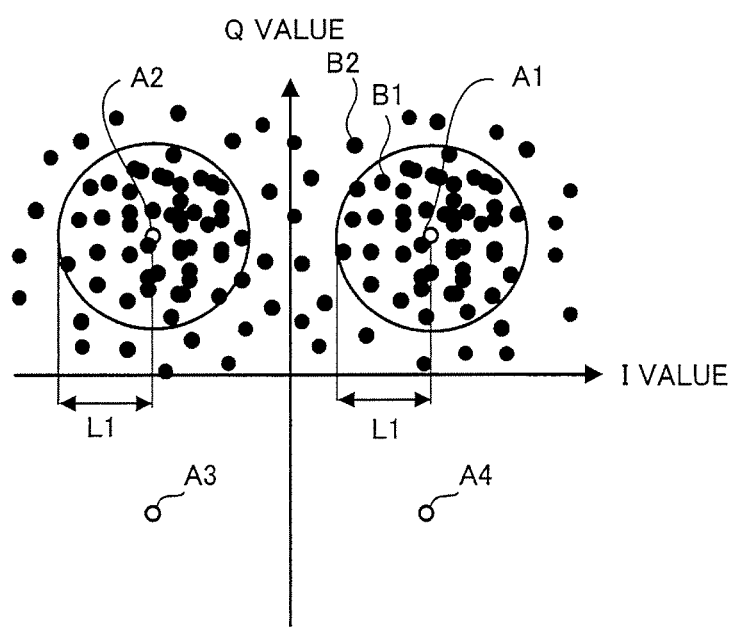
FIG. 10 illustrates a second determination example of whether a reception state is good or not.

FIG. 10 illustrates a second determination example of whether the reception state is good or not. FIG. 10 also illustrates ideal reception signal points A1 to A4 when the modulation method of the data signal is QPSK, and reception signal points (illustrated as black circles) of the corrected data signal, which are plotted on the I-Q plane.

As described above, the threshold value of the number of reception signal points that are more than the distance L1 away is 20, with which the reception state determination unit 43a determines that the reception state is bad. In the example of FIG. 10, the number of reception signal points that are more than the distance L1 away from the ideal reception signal points A1 to A4 is equal to or larger than 20, and therefore the reception state determination unit 43a determines that the reception state is bad. The reception state determination unit 43b executes the same determination process.

Figure 11:
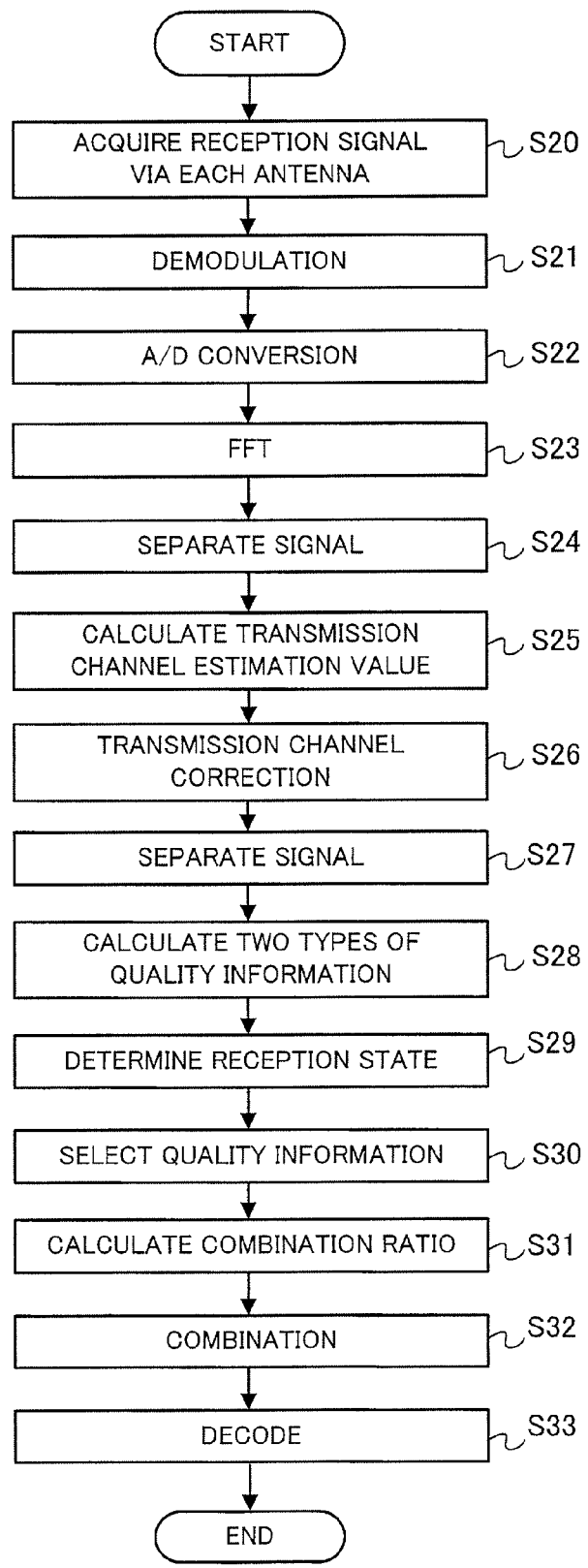
FIG. 11 is a flowchart illustrating a procedure of an example of a reception method by a receiver circuit of the second embodiment.

In the following, a reception method using the receiver circuit 40 of the second embodiment is described with reference to a flowchart. FIG. 11 is a flowchart illustrating a procedure of an example of the reception method by the receiver circuit of the second embodiment. The processes of steps S20, S21, S22, S23, S24, S25, S26, and S27 are same as the processes of step S1 to S8 illustrated in FIG. 4, and thus their description will be omitted.

Step S28: The signal processing units 41a and 41b each calculate two types of quality information. That is, the quality information calculation units 18a and 18b calculate quality information on the basis of the corrected control signal, and the quality information calculation units 42a and 42b calculate quality information on the basis of the corrected data signal.

Step S29: The reception state determination units 43a and 43b determine whether the reception state is good or not when receiving the reception signal that has been received by the antennas ANTa and ANTb. The determination of whether the reception state is good or not is performed as illustrated in FIGS. 9 and 10, for example.

Step S30: The selection unit 44 selects the quality information to be used in the combination ratio calculation on the basis of the determination result of whether the reception state is good or not, and supplies it to the combination ratio calculation unit 3.

Step S31: The combination ratio calculation unit 3 calculates a combination ratio on the basis of two types of quality information selected by the selection unit 44 from among the above four types of quality information.

The processes of steps S32 and S33 are same as the processes of steps S11 and S12 illustrated in FIG. 4, and thus their description will be omitted.

When determining that the reception state is bad, the above receiver circuit 40 of the second embodiment calculates a combination ratio, using the quality information calculated based on the corrected control signal in the same way as the receiver circuit 1 of the first embodiment, so as to provide the same advantage as the receiver circuit 1. Also, when determining that the reception state is good, the receiver circuit 40 calculates a combination ratio, using the quality information calculated based on the corrected data signal.

The data signal is modulated by the modulation method that is less tolerant to noise than that used for the control signal as described above, but includes more information than the control signal, such as TMCC and AC, as illustrated in FIG. 2. Hence, when the reception state is good (a carrier-to-noise ratio is large), the quality information calculated based on the data signal (corrected data signal) containing much information is relatively accurate. Thus, the combination ratio calculation unit 3 calculates the combination ratio, using such quality information, and the combination unit 4 executes combination, using the combination ratio, in order to improve the combination accuracy. As described above, the selection unit 44 selects accurate quality information according to the reception state, so that the combination is executed accurately according to the reception state, in order to improve the reception performance.

(Third Embodiment)

Figure 12:
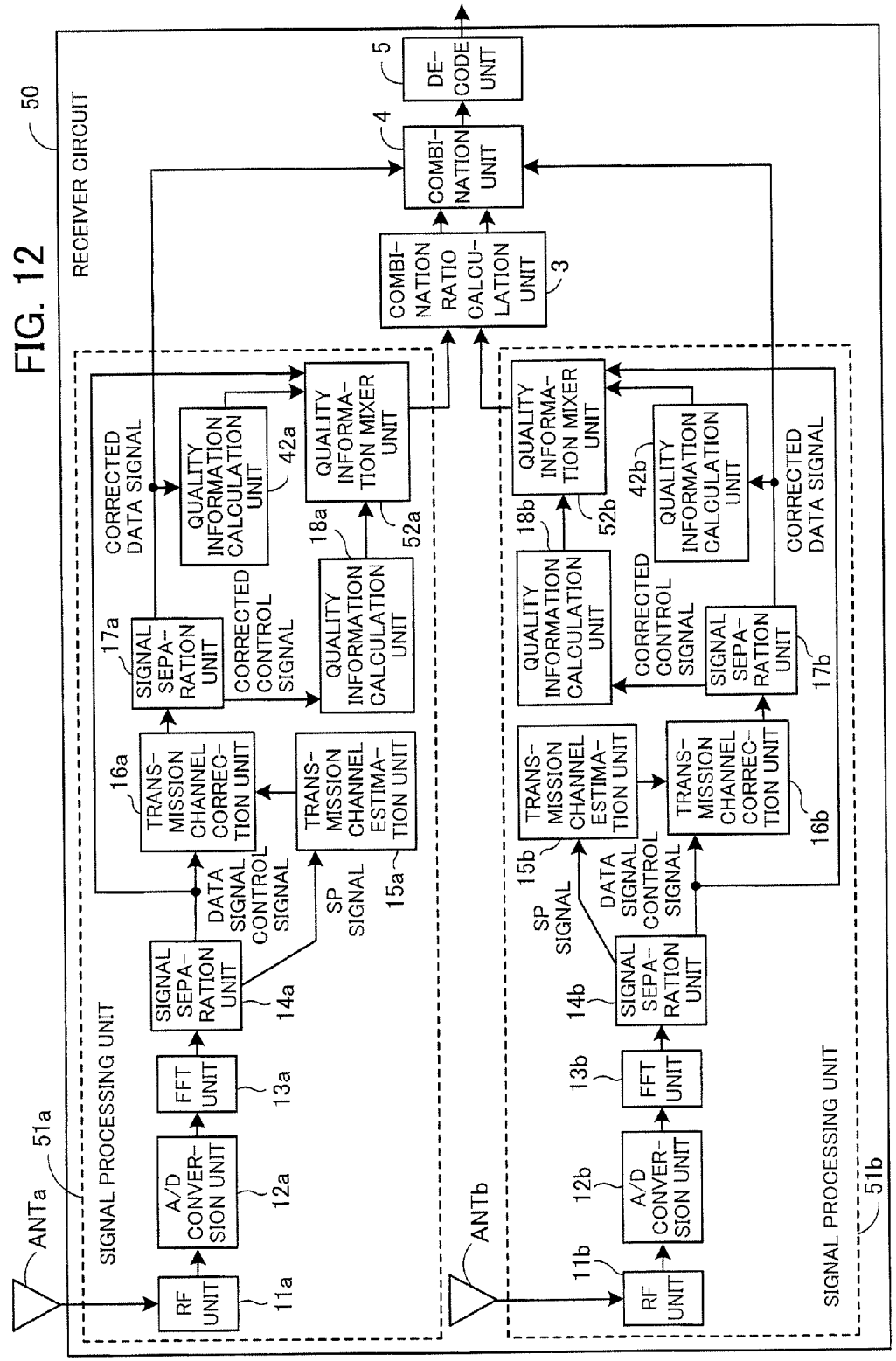
FIG. 12 illustrates an example of a receiver circuit of a third embodiment.

FIG. 12 illustrates an example of the receiver circuit of the third embodiment. The same elements as the receiver circuit 40 illustrated in FIG. 8 are denoted with the same reference signs, and their descriptions will be omitted. Each unit included in the receiver circuit 50 is, for example, a circuit constituting a part of the receiver circuit 50.

In the receiver circuit 50 of the third embodiment, the signal processing units 51*a* and 51*b* include quality information mixer units 52*a* and 52*b*. The quality information mixer units 52*a* and 52*b* generate quality information (a modulation error ratio), by mixing the quality information (a carrier-to-noise ratio) calculated by the quality information calculation units 18*a* and 18*b* and the quality information calculated by the quality information calculation units 42*a* and 42*b*. In other words, the quality information mixer units 52*a* and 52*b* mix the quality information calculated based on the corrected data signal with the quality information calculated based on the corrected control signal. Here, the quality information calculated based on the corrected data signal is mixed at a lower ratio, as the frequency of the corrected data signal is closer to the frequency of the corrected control signal. The combination ratio calculation unit 3 calculates a combination ratio on the basis of the quality information generated by the quality information mixer units 52*a* and 52*b*. Each unit included in the signal processing units 51*a* and 51*b* is, for example, a circuit constituting a part of the signal processing units 51*a* and 51*b*.

Figure 13:
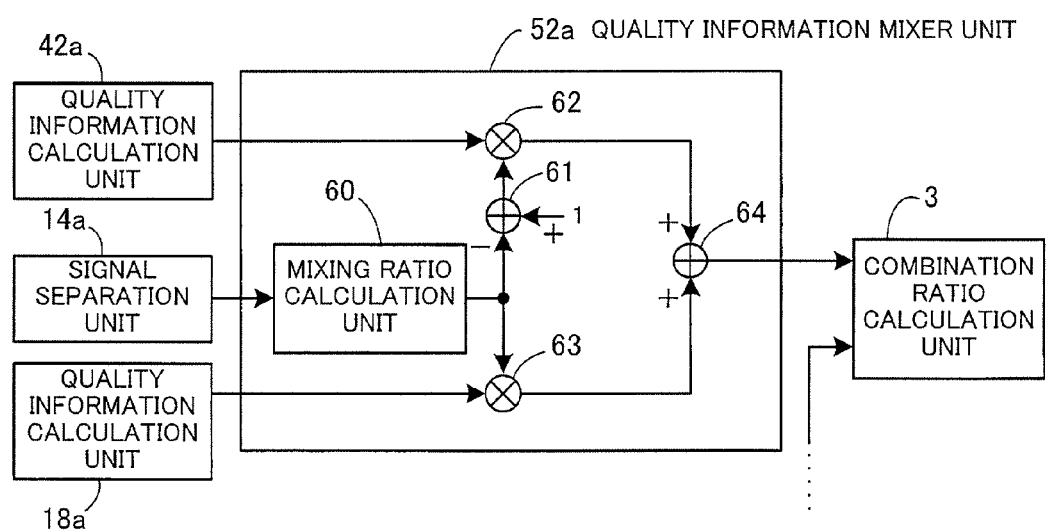
FIG. 13 illustrates an example of quality information mixer unit.

FIG. 13 illustrates an example of the quality information mixer unit. The quality information mixer unit 52*a* includes a mixing ratio calculation unit 60, an adder 61, multipliers 62 and 63, and an adder 64.

The mixing ratio calculation unit 60 calculates a larger ratio, as the corrected data signal for calculating the quality information has a frequency closer to the frequency of the corrected control signal, on the basis of the carrier number of the data signal or the control signal output from the signal separation unit 14*a*. In the terrestrial digital broadcasting, correspondence between a control signal (AC and TMCC) and a carrier number (i.e. frequency) at which the control signal is located is defined in advance, for each segment. Hence, the mixing ratio calculation unit 60 stores the carrier number of the control signal in an undepicted memory unit, and calculates a higher ratio as the carrier number of the data signal or the control signal output from the signal separation unit is closer to the stored carrier number, for example. The calculated ratio is between 0 and 1.

The adder 61 subtracts the ratio calculated by the mixing ratio calculation unit 60 from 1. The multiplier 62 multiplies the quality information calculated by the quality information calculation unit 42*a*, by the output value of the adder 61. The multiplier 63 multiplies the quality information calculated by the quality information calculation unit 18*a*, by the ratio calculated by the mixing ratio calculation unit 60. The adder 64 adds the output values of the multipliers 62 and 63 and outputs new quality information.

This mixing ratio calculation unit 60 mixes the quality information calculated based on the corrected data signal with the quality information calculated based on the corrected control signal, in order to calculate new quality information. Here, the quality information calculated based on the corrected data signal is mixed at a lower ratio, as the frequency of the corrected data signal is closer to the frequency of the corrected control signal. The quality information calculated based on the corrected data signal is mixed at a higher ratio, as the frequency of the corrected data signal is more different from the frequency of the corrected control signal, because the reliability of the quality information calculated based on the corrected control signal is low at the frequency more different from the frequency of the corrected control signal. The quality information mixer unit 52*b* is configured by the same circuit.

FIG. 14 illustrates an example of values and ratios before and after mixing the quality information of each carrier when the quality information of the data signal includes an error. In FIG. 14, an auxiliary channel (AC) of control signal is set at the position of the carrier number 20 corresponding to frequency. The carrier numbers 14 to 19 and 21 to 26 are allocated to data signals (data).

The quality information of each carrier calculated by the signal processing units 51*a* and 51*b* before mixing, particularly the quality information (hereinafter referred to as modulation error ratio) calculated based on the data signal (corrected data signal), is 8.0 dB in the signal processing unit 51*a*, and 4.0 dB in the signal processing unit 51*b*. In contrast, the quality information calculated based on the control signal (corrected control signal) is 2.0 dB in the signal processing unit 51*a*, and 6.0 dB in the signal processing unit 51*b*, and consequently the value of the quality information is reversed between the signal processing unit 51*a* and the signal processing unit 51*b*.

As described above, since the quality information calculated based on the corrected control signal is considered to be accurate, it is possible that the modulation error ratio is not correct in the example of FIG. 14.

The quality information mixer units 52*a* and 52*b* change the ratio of the quality information calculated based on the corrected control signal, along a linear function as illustrated in FIG. 14. Thereby, the modulation error ratio calculated based on the corrected data signal is mixed with the quality information calculated based on the corrected control signal, at a lower ratio as the frequency of the corrected data signal is closer to the frequency of the corrected control signal.

In the example of FIG. 14, the mixing is performed at the carrier number between 16 and 24. The quality information mixer unit 52*a* of the signal processing unit 51*a* mixes the modulation error ratio calculated based on the data signal of the carrier number 19 with the quality information of the auxiliary channel of the carrier number 20, in accordance with the following formula, for example.

2.0 dB (i.e., the quality information calculated based on the corrected control signal)×0.8 (i.e., the ratio when the carrier number is 18)+8.0 dB (the modulation error ratio calculated based on the corrected data signal)×0.2 (the value generated by subtracting the above ratio from 1.0)=3.2 dB As described above, after mixing, the modulation error ratio calculated based on the data signal of the carrier number 19 is 3.2 dB. The signal processing unit 51*b* executes the same mixing, and the modulation error ratio calculated based on the data signal of the carrier number 19 is 5.6 dB. As described above, when the modulation error ratio includes an error, the mixing is executed at the above ratio, in order to obtain more accurate quality information.

Note that, when the value of the modulation error ratio is equal to the value of the quality information calculated based on the corrected control signal, the value of the quality information mixed in and output from the quality information mixer units 52*a* and 52*b* is the same value as these two values.

(Exemplary Variant 1)

Figure 15:
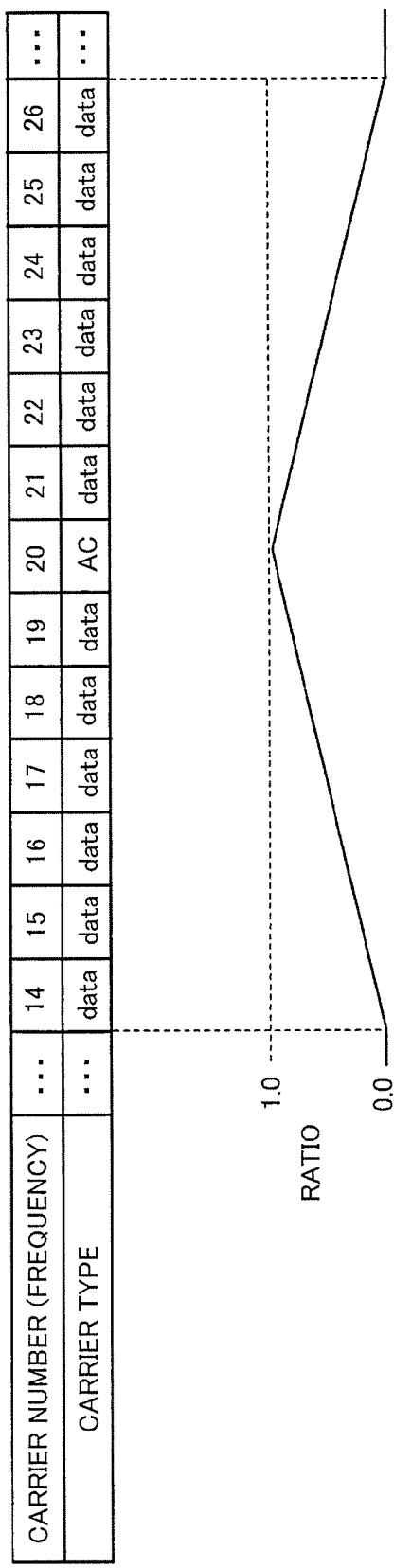
FIG. 15 illustrates an example of a ratio for mixing quality information.

FIG. 15 illustrates an example of a ratio for mixing quality information. In the example of FIG. 14, the mixing is executed (in other words, the ratio is set equal to or higher than 0) over the quality information corresponding to nine carrier numbers with the carrier number for the auxiliary channel (AC) of the control signal at the center. In contrast, in the example of FIG. 15, the mixing is executed over a broader range. The mixing ratio calculation unit 60 makes the slope of the ratio in relation to the carrier number less steep, in order to broaden the range over which the mixing is executed.

(Exemplary Variant 2)

Figure 16:
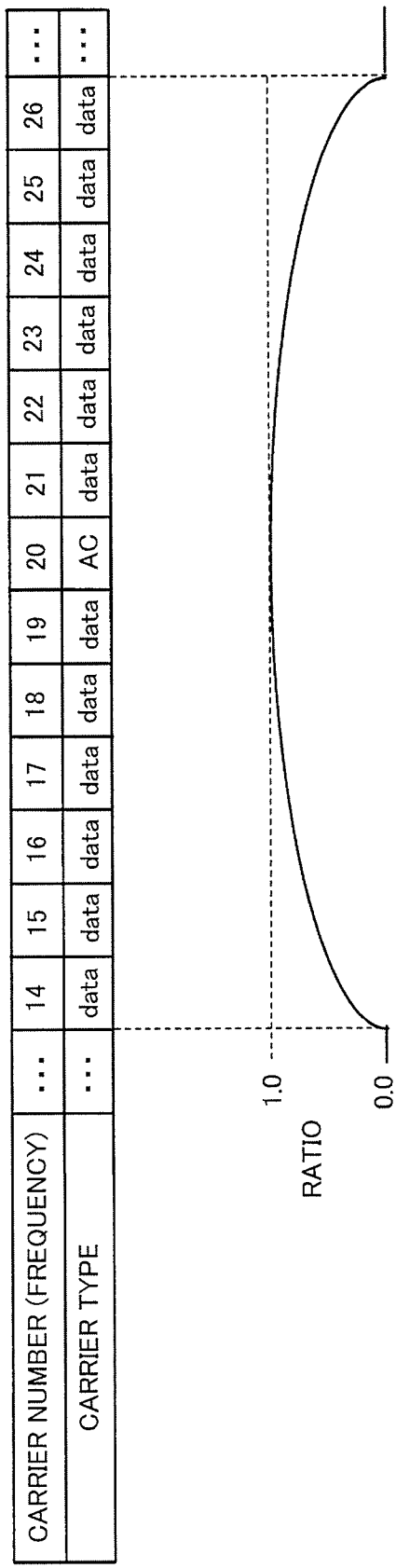
FIG. 16 illustrates another example of a ratio for mixing quality information.

FIG. 16 illustrates another example of a ratio for mixing quality information. In the example of FIG. 14, the mixing ratio calculation unit 60 changes the ratio with the carrier number along a linear function, with the carrier number corresponding to the auxiliary channel (AC) of the control signal at the center. In contrast, the mixing ratio calculation unit 60 may change the ratio with the carrier number along the quadratic function, as illustrated in FIG. 16.

The mixing ratio calculation unit 60 may estimate a fading state and select how to change the ratio as appropriate, depending on the estimated fading state. In some cases, it is inappropriate that, when the reception signal fluctuates in intensity significantly in the frequency direction due to frequency selective fading for example, the quality information be changed to a high carrier-to-noise ratio, using the quality information calculated based on the corrected control signal, and supplied to the combination ratio calculation unit 3. This is because the combination ratio of the data signal affected by fading is possibly increased significantly, in reality. In that case, the mixing ratio calculation unit steepens the slope for changing the ratio with the carrier number, so as to reduce the number of carriers whose quality information calculated based on the corrected control signal is mixed, for example.

Figure 17:
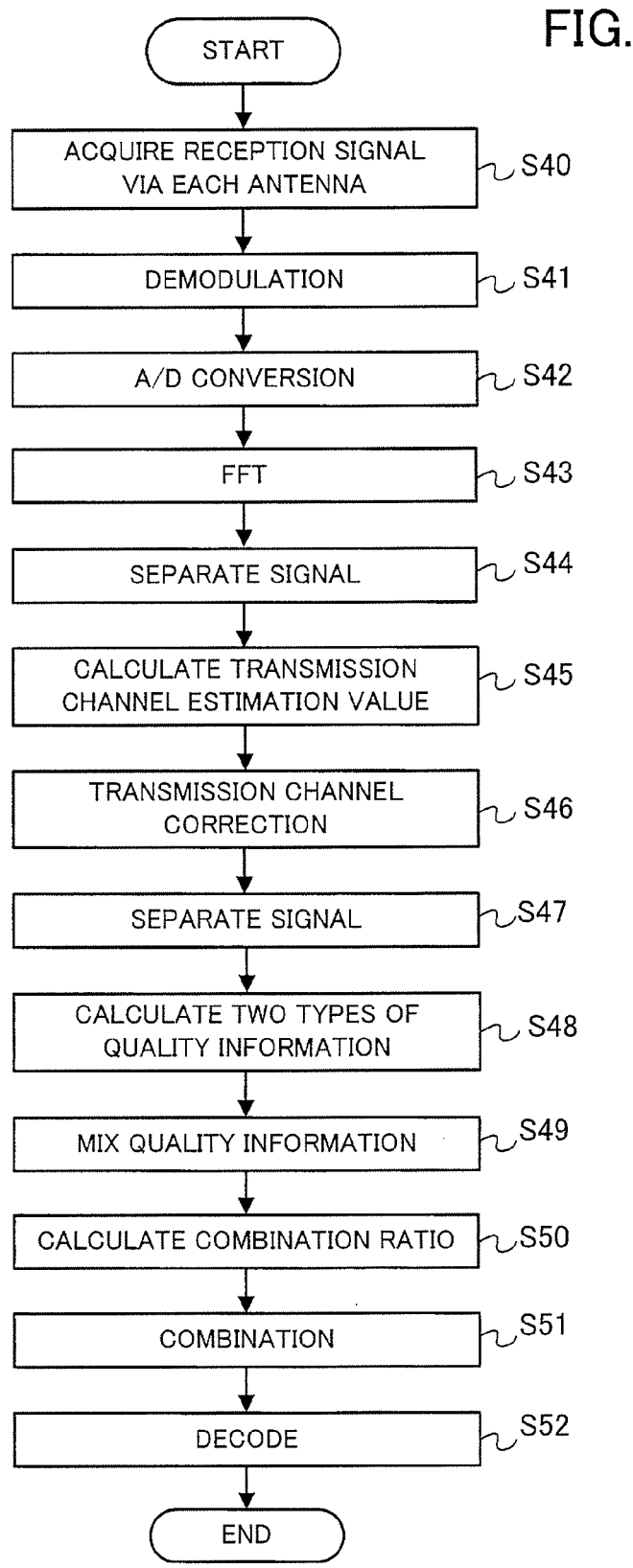
FIG. 17 is a flowchart illustrating a procedure of an example of a reception method by a receiver circuit of the third embodiment.

In the following, the reception method using the receiver circuit 50 of the third embodiment is described with reference to a flowchart. FIG. 17 is a flowchart illustrating a procedure of an example of the reception method by the receiver circuit of the third embodiment. The processes of steps S40, S41, S42, S43, S44, S45, S46, S47, and S48 are same as the processes of steps S20 to S28 illustrated in FIG. 11, and thus their description will be omitted.

Step S49: The signal processing units 51*a* and 51*b* each mix two types of quality information that have been calculated.

Step S50: The combination ratio calculation unit 3 calculates a combination ratio on the basis of the two types of quality information mixed and newly generated in the respective signal processing units 51*a* and 51*b*.

The processes of steps S51 and S52 are same as the processes of steps S32 and S33 illustrated in FIG. 11, and thus their description will be omitted.

In the above receiver circuit 50, the quality information calculated based on the data signal (corrected data signal) at a similar frequency to the control signal transmitted by the modulation method that is tolerant to noise is mixed at the above ratio with the highly reliable quality information calculated based on the corrected control signal. With the accurate quality information calculated as described above, the combination ratio calculation unit 3 calculates an accurate combination ratio to enhance combination accuracy.

In the above, one aspect of the receiver circuit and the reception method has been described with reference to the embodiments. However, these embodiments are just examples and are not limited to the above description.

For example, in the above, the receiver circuit combines reception signals from two antennas, but the receiver circuit may combine reception signals from three or more antennas. In that case, for example, three or more signal processing units (which are denoted with 2*a* and 2*b* in FIG. 1) are provided, and the combination ratio of corrected data signals is calculated on the basis of the ratio of quality information values output from the signal processing units.

According to the receiver circuit and the reception method of the disclosure, the diversity combining is executed accurately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A receiver circuit for performing diversity combining, comprising:
    a first transmission channel correction circuit configured to generate a third signal from a first signal, and a fourth signal from a second signal, by executing a transmission channel correction to the first signal and the second signal, the first signal being transmitted by a first modulation method, the second signal being transmitted by a second modulation method that is more tolerant to noise than the first modulation method, the first signal and the second signal being included in a first reception signal received by a first antenna;
    a first quality information calculation circuit configured to calculate first quality information indicating quality of the first reception signal on the basis of the fourth signal;

a second transmission channel correction circuit configured to generate a seventh signal from a fifth signal, and an eighth signal from a sixth signal, by executing a transmission channel correction to the fifth signal and the sixth signal, the fifth signal being transmitted by the first modulation method, the sixth signal being transmitted by the second modulation method, the fifth signal and the sixth signal being included in a second reception signal received by a second antenna;

a second quality information calculation circuit configured to calculate second quality information indicating quality of the second reception signal on the basis of the eighth signal;

a combination ratio calculation circuit configured to calculate a combination ratio of the third signal and the seventh signal on the basis of the first quality information and the second quality information; and a combination circuit configured to combine the third signal and the seventh signal at the combination ratio.

2. The receiver circuit according to claim 1, further comprising:

a third quality information calculation circuit configured to calculate third quality information indicating quality of the first reception signal on the basis of the third signal;

a fourth quality information calculation circuit configured to calculate fourth quality information indicating quality of the second reception signal on the basis of the seventh signal;

a first reception state determination circuit configured to determine whether a first reception state is good or not when the first reception signal is received, on the basis of the third signal;

a second reception state determination circuit configured to determine whether a second reception state is good or not when the second reception signal is received, on the basis of the seventh signal; and a selection circuit configured to select the first quality information when the first reception state determination circuit determines that the first reception state is worse than a first threshold, select the third quality information when the first reception state determination circuit determines that the first reception state is better than the first threshold, select the second quality information when the second reception state determination circuit determines that the second reception state is worse than a second threshold, and select the fourth quality information when the second reception state determination circuit determines that the second reception state is better than the second threshold, wherein the combination ratio calculation circuit calculates the combination ratio on the basis of any two of the first to fourth quality information selected by the selection circuit.

3. The receiver circuit according to claim 2, wherein the first reception state determination circuit determines whether the first reception state is good or not on the basis of the number of reception signal points of the third signal that is at a position more than a first distance away from an ideal reception signal point when the third signal is plotted on an I-Q plane.

4. The receiver circuit according to claim 2, wherein the second reception state determination circuit determines whether the second reception state is good or not on the basis of the number of reception signal points of the seventh signal that is at a position more than a first distance away from an ideal reception signal point when the seventh signal is plotted on an I-Q plane.

5. The receiver circuit according to claim 1, further comprising:

a third quality information calculation circuit configured to calculate third quality information indicating quality of the first reception signal on the basis of the third signal;

a fourth quality information calculation circuit configured to calculate fourth quality information indicating quality of the second reception signal on the basis of the seventh signal;

a first quality information mixer circuit configured to generate fifth quality information by mixing the third quality information calculated with the first quality information, wherein the third quality information is mixed with the first quality information at a ratio that is lower as a frequency of the third signal is closer to a frequency of the fourth signal; and a second quality information mixer circuit configured to generate sixth quality information by mixing the fourth quality information calculated with the second quality information, wherein the fourth quality information is mixed with the second quality information at a ratio that is lower as a frequency of the seventh signal is closer to a frequency of the eighth signal, wherein the combination ratio calculation circuit calculates the combination ratio on the basis of the fifth quality information and the sixth quality information.

6. The receiver circuit according to claim 1, wherein the first signal is a data signal, and the second signal is a control signal.

7. The receiver circuit according to claim 1, wherein the first modulation method is one of QPSK, 16QAM, and 64QAM, and the second modulation method is one of DBPSK and BPSK.

8. The receiver circuit according to claim 2, wherein each of the first quality information and the second quality information is a carrier-to-noise ratio, and each of the third quality information and the fourth quality information is a modulation error ratio.

9. A reception method for performing diversity combining, comprising:

generating a third signal from a first signal, and a fourth signal from a second signal, by executing a transmission channel correction to the first signal and the second signal, the first signal being transmitted by a first modulation method, the second signal being transmitted by a second modulation method that is more tolerant to noise than the first modulation method, the first signal and the second signal being included in a first reception signal received by a first antenna;

calculating first quality information indicating quality of the first reception signal on the basis of the fourth signal;

generating a seventh signal from a fifth signal, and an eighth signal from a sixth signal, by executing a transmission channel correction to the fifth signal and the sixth signal, the fifth signal being transmitted by the first modulation method, the sixth signal being transmitted by the second modulation method, the fifth signal and the sixth signal being included in a second reception signal received by a second antenna;

calculating second quality information indicating quality of the second reception signal on the basis of the eighth signal;

calculating a combination ratio of the third signal and the seventh signal on the basis of the first quality information and the second quality information; and combining the third signal and the seventh signal at the combination ratio.

10. The reception method according to claim 9, further comprising:
calculating third quality information indicating quality of the first reception signal on the basis of the third signal;
calculating fourth quality information indicating quality of the second reception signal on the basis of the seventh signal;
determining whether a first reception state is good or not when the first reception signal is received, on the basis of the third signal;
determining whether a second reception state is good or not when the second reception signal is received, on the basis of the seventh signal;
selecting the first quality information when determining that the first reception state is worse than a first threshold, selecting the third quality information when determining that the first reception state is better than the first threshold, selecting the second quality information when determining that the second reception state is worse than a second threshold, and selecting the fourth quality information when determining that the second reception state is better than the second threshold; and
calculating the combination ratio on the basis of any two of the first to fourth quality information selected.

11. The reception method according to claim 10, wherein the determining whether a first reception state is good or not includes determining whether the first reception state is good or not on the basis of the number of reception signal points of the third signal that is at a position more than a first distance away from an ideal reception signal point when the third signal is plotted on an I-Q plane.

12. The reception method according to claim 10, wherein the determining whether a second reception state is good or not includes determining whether the second reception state is good or not on the basis of the number of reception signal points of the seventh signal that is at a position more than a first distance away from an ideal reception signal point when the seventh signal is plotted on an I-Q plane.

13. The reception method according to claim 9, further comprising:
calculating third quality information indicating quality of the first reception signal on the basis of the third signal;
calculating fourth quality information indicating quality of the second reception signal on the basis of the seventh signal;
generating fifth quality information by mixing the third quality information calculated with the first quality information, wherein the third quality information is mixed with the first quality information at a ratio that is lower as a frequency of the third signal is closer to a frequency of the fourth signal;
generating sixth quality information by mixing the fourth quality information calculated with the second quality information, wherein the fourth quality information is mixed with the second quality information at a ratio that is lower as a frequency of the seventh signal is closer to a frequency of the eighth signal; and
calculating the combination ratio on the basis of the fifth quality information and the sixth quality information.

14. The reception method according to claim 9, wherein the first signal is a data signal, and
the second signal is a control signal.

15. The receiver circuit according to claim 9, wherein the first modulation method is one of QPSK, 16QAM, and 64QAM, and
the second modulation method is one of DBPSK and BPSK.

16. The reception method according to claim 10, wherein each of the first quality information and the second quality information is a carrier-to-noise ratio, and
each of the third quality information and the fourth quality information is a modulation error ratio.

* * * * *